US012536052B2

(12) United States Patent
Mays

(10) Patent No.: US 12,536,052 B2
(45) Date of Patent: Jan. 27, 2026

(54) SYSTEMS AND METHODS FOR DEPLOYING PERMISSIONS IN A DISTRIBUTED COMPUTING SYSTEM

(71) Applicant: Stripe, Inc., South San Francisco, CA (US)

(72) Inventor: Benjamin Mays, Austin, TX (US)

(73) Assignee: Stripe, Inc., South San Francisco, CA (US)

( * ) Notice: Subject to any disclaimer, the term of this patent is extended or adjusted under 35 U.S.C. 154(b) by 907 days.

(21) Appl. No.: 17/729,369

(22) Filed: Apr. 26, 2022

(65) Prior Publication Data

US 2023/0342217 A1    Oct. 26, 2023

(51) Int. Cl.
  *G06F 9/50*    (2006.01)
  *G06F 9/46*    (2006.01)

(52) U.S. Cl.
  CPC ............ *G06F 9/5072* (2013.01); *G06F 9/468* (2013.01); *G06F 9/5016* (2013.01); *G06F 9/5027* (2013.01); *G06F 9/5077* (2013.01)

(58) Field of Classification Search
  CPC ...... G06F 9/5072; G06F 9/468; G06F 9/5016; G06F 9/5027; G06F 9/5077; G06F 21/6218
  See application file for complete search history.

(56) References Cited

U.S. PATENT DOCUMENTS

| | | | | |
|---|---|---|---|---|
| 7,225,263 | B1* | 5/2007 | Clymer | H04L 63/20 713/168 |
| 11,126,563 | B1* | 9/2021 | Emelyanov | G06F 12/1441 |
| 2002/0026592 | A1* | 2/2002 | Gavrila | G06F 21/6218 709/229 |
| 2011/0296414 | A1* | 12/2011 | Hinojosa | G06F 21/6218 718/100 |
| 2012/0137360 | A1* | 5/2012 | Henderson | H04L 63/102 726/17 |

(Continued)

OTHER PUBLICATIONS

Downloaded from Wikipedia on May 22, 2025, 11 pages. Internet URL: https://en.wikipedia.org/wiki/Error_detection_and_correction.

*Primary Examiner* — Kevin L Young
*Assistant Examiner* — Phuong N Hoang
(74) *Attorney, Agent, or Firm* — FINNEGAN, HENDERSON, FARABOW, GARRETT & DUNNER, LLP

(57) ABSTRACT

A method and apparatus for managing and using permissions in a distributed services system is described. The method may include receiving, by a service system of the distributed services system, a definition of a permissions data structure and a mapping of permission positions from a permissions bitmap log to permissions in the permissions data structure. The method may also include receiving, by the service system, a service-to-service message that comprises a request of the service system and an access token having one or more permissions bitmap logs associated with the message. Furthermore, the method may include determining, by the service system, a set of permissions that are within an intersection of permissions between the one or more permissions bitmap logs associated with the message and the definition of the permissions data structure, and then processing the request based on the determined set of permissions.

20 Claims, 7 Drawing Sheets

(56) References Cited

U.S. PATENT DOCUMENTS

| | | | |
|---|---|---|---|
| 2016/0219347 A1* | 7/2016 | Kitahara | H04N 21/2541 |
| 2018/0211055 A1* | 7/2018 | Balijepalli | H04L 9/3213 |
| 2020/0280846 A1* | 9/2020 | Frederick | G06F 21/6245 |
| 2021/0065437 A1* | 3/2021 | Brkic | G06T 15/405 |
| 2023/0153449 A1* | 5/2023 | Li | G06F 21/6218 726/4 |

\* cited by examiner

SYSTEMS AND METHODS FOR DEPLOYING PERMISSIONS IN A DISTRIBUTED COMPUTING SYSTEM

BACKGROUND

Organizations are increasingly using distributed computing techniques to provide their products and services to end users. Such distributed computing techniques often involve the distribution of tasks performed by different physical computing resources that communicate with one another via a computing network. The distributed physical computing resources utilize network-based communication to exchange messaging that support each physical machine's functions and/or the functions of other machines within the distributed computing environment to complete an overall operation through a collection of distributed tasks. Thus, the collection of distributed physical computing resources cooperate to provide the organization's products and services to their end users.

One approach to an organization utilizing distributed computing systems is to represent different concepts and/or resources as distinct services, where distinct services each have their own distinct processing resources and data storage within the distributed computing environment. Then, service-to-service network calls provide information transfer, requests for support services (e.g., where a service performs some function for another service), responses (e.g., a result of one service performing a requested function), etc. to support the various operations, services, and products of the organization.

While the distribution of concepts and/or resources as distinct services processed by distinct systems is helpful in developing, maintaining and then providing multiple services by an organization to end users, certain problems may arise. In particular, such problems arise when seeking to provide and enforce permissions granting or not granting a service the ability to perform a requested function on behalf of a particular user or other service. That is, a service should only perform a function or operation that a user and/or service is permitted to have performed. To manage permissions, the distributed service system will typically maintain permissions for each user, account, service, etc. that may use the various services of the distributed computing system, and what functions may be performed. For example, a user, service, etc. may have permissions associated with an administrator, which gives them access to certain functions at certain distributed services. However, a first-time user may be associated with different permissions allowing a much more limited set of functions that can be performed at the distributed services.

Because distributed computing systems may deploy a plurality of services, each with their own sets and/or shared permissions, the distributed computing system may be required to manage hundreds, thousands, or more permissions. Thus, when using service-to-service messaging, how the permissions are encoded within messages, evaluated at services, and managed by the distributed computing system can have a significant impact on network utilization, latency in processing service requests, storage requirements at each service system, etc. presenting several technical challenges that impact the performance and operation of the distributed computing system.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
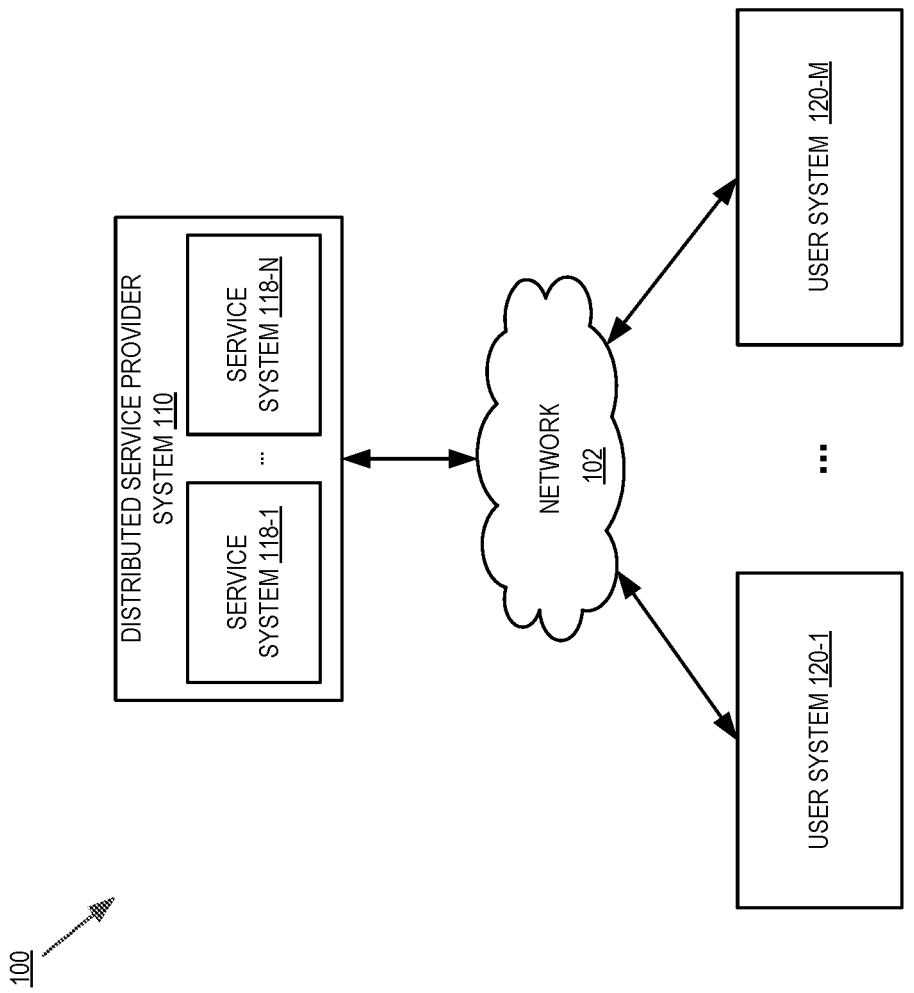
FIG. 1 is a block diagram of an exemplary system architecture for a distributed service provider system using permissions to enable access to distributed service to users.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "updating", "distributing", "compacting", "initiating", "obtaining", "encoding", "transmitting", "performing", "determining", "applying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for a distributed service provider system using permissions to enable access to distributed service to users. In one embodiment, the system 100 includes distributed service provider system 110 and one or more user systems, such as user system 120. In one embodiment, one or more systems (e.g., systems 120-1 through 120-M) may be mobile computing devices, such as a smartphone, tablet computer, smartwatch, etc., as well computer systems, such as a desktop computer system, laptop computer system, server computer systems, etc. used by end users to access the products provided by distributed service provider system 110. The distributed service provider system 110 may also be one or more computing devices, such as one or more server computer systems, desktop computer systems, etc.

The distributed service provider system 110 and user systems 120-1 through 120-M may be coupled to a network 102 and communicate with one another using any of the standard protocols for the exchange of information, including secure communication protocols. In one embodiment, one or more of the distributed service provider system 110 and user systems 120-1 through 120-M may run on one Local Area Network (LAN) and may be incorporated into the same physical or logical system, or different physical or logical systems. Alternatively, the distributed service provider system 110 and user systems 120-1 through 120-M may reside on different LANs, wide area networks, cellular telephone networks, etc. that may be coupled together via the Internet but separated by firewalls, routers, and/or other network devices. In one embodiment, distributed service provider system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, distributed service provider system 110 provides financial processing products to one or more merchants, agents of the merchants, end users, etc. For example, distributed service provider system 110 may manage merchant accounts held at the distributed service provider system 110, run financial transactions initiated at end user system performed on behalf of a merchant systems, clear transactions, performing payouts to merchants and/or merchants' agents, manage merchant and/or agent accounts held at the distributed service provider system 110, as well as other services typically associated with commerce platforms systems such as, for example, STRIPE™. However, distributed service provider system 110 is not limited to financial processing systems, as any distributed computing system that distributes service processing among different physical machines and seeks to ensure access and deletion of user data, may use the techniques discussed herein. For example, distributed computing environments that provide media distribution products, productivity products, social networking products, customer relationship management products, communication products, software development products, etc. may utilize the techniques discussed herein.

In an embodiment, distributed service provider system 110 is a distributed computing environment that provides products to end users, such as users associated with user system(s) 120-1 through 120-M. Each end user system may interact directly with the products or services of the distributed service provider system 110, or through intermediate systems (not shown) that employs the products or services of the distributed service provider system 110 (e.g., application programming interface(s) (APIs), software libraries, products, etc.) to interact with end users. Products and services of the distributed service provider system 110 can be considered to be anything from systems that support end users (e.g., data storage, content management, payment processing, etc.) to systems that support the operations of the distributed service provider system 110.

In embodiments, distributed service provider system 110, in providing their product(s) to user systems 120-1 through 120-M, therefore represents different concepts within the distributed service provider system 110 as services. For example, a first service may process functions, actions, etc. to perform a first concept, a second service may process functions, actions, etc. to perform a second concept, and so on. For example, for a distributed service provider system 110 that provides subscription service management for an end user system 120-1, the concepts used for providing the subscription service management may include a subscription concept that handles setting up new subscriptions, managing subscription parameters, cancelling existing subscriptions, and initiating subscription billing. The concepts may further include a second, and distinct, invoicing concept that generates, distributes, and tracks invoices for subscriptions. Furthermore, as is important in distributed service based systems, the invoicing concept not only interacts with the subscription concept, but may also interact with other concepts that may utilizing invoicing for their respective concepts, such as a single-time purchase concept, an insurance concept, a refund processing concept, a resource tracking and utilizing concept, etc.

In embodiments, each concept is implemented as a service within the distributed service provider system 110, such that the service is executed on a distinct service system. Thus, distributed service provider system 110 includes a plurality of service systems 118-1 through 118-N that support the concepts that, as a whole, support the products of the distributed service provider system 110. Furthermore, each of the plurality of service systems 118-1 through 118-N are executed by one or more distinct processing systems having their own resources (e.g., processor(s), memory, network interfaces, transceivers, etc.), their own software implementations, and provide service-to-service messaging as network based messaging between the distinct processing resources.

As discussed herein, since each service of the distributed service provider system 110 is performed on a distinct service system, which has its own processing resources, storage, and implementation, messaging between services requesting that a service perform certain functions for a user system or another service carries one or more access tokens. An access token, as discussed herein, is a data structure that encodes, among other data, a set of permissions associated with the message and function requested to be performed by the service-to-service message. Given the sensitive nature of the access token, it may be encrypted by a sending service system and then decrypted by a receiving service system using one or more encryption techniques. Then, when a service system receives a request with an access token, the service system will perform the requested function(s) when the request is accompanied by the appropriate permissions to perform the function (e.g., the user and/or service associated with the request has the appropriate permission). For example, a service request may include a request to read data from a data store, have the service modify the read data, and then write the updated data back to the data store. Thus, the service system receiving the request will determine whether the user/service associated with the request has the permissions to perform the related read, processing, and writing, and if there are sufficient permissions, will perform the associated function(s). If there are insufficient permission(s) (e.g., the user/service may not have on or more of the permissions needed to read, process, and write data as requested), then the request may be denied and a response returned to the requesting service.

Distributed service provider system 110 may include a plurality of service systems 118-1 through 118-N providing a vast array of services to end users, services that manage the distributed service provider system 110, etc. Furthermore, user systems 120-1 through 120-M may include a vast array of different types of users, such as customers, merchants, banks, credit agencies, etc. Thus, the number of permissions that may be include with and used for each request may be on the order of hundreds, thousand, or more. As a result, how to encode the permissions efficiently for network based transfer between services to minimize bandwidth usage, and to simply processing for enforcing encoded permissions, becomes increasingly important. Furthermore, service systems 118-1 through 118-N, as well as later introduced service systems, may be under constant development (e.g., continuous integration and build) by adding new features, improving old features, etc. As a result of this continued development, new permissions may be added, but service-to-service requests and processing may not have the latest sets of permissions, or conversely, may have a request with the latest permission but does not have the updated mechanisms to use the latest permissions. Thus, how to process permissions by the services in view of such permission drift between services and/or permission management, and/or permission reversions, also becomes essential.

As will be discussed in greater detail below, an efficient encoding technique utilizing versioning and a bitmap log structure is used to ensure appropriate permissions are enforced in service-to-service messaging, that the permissions are efficiently encoded to minimize processing usage and network bandwidth consumption in their exchange, and that privilege escalation is avoided.

Figure 2:
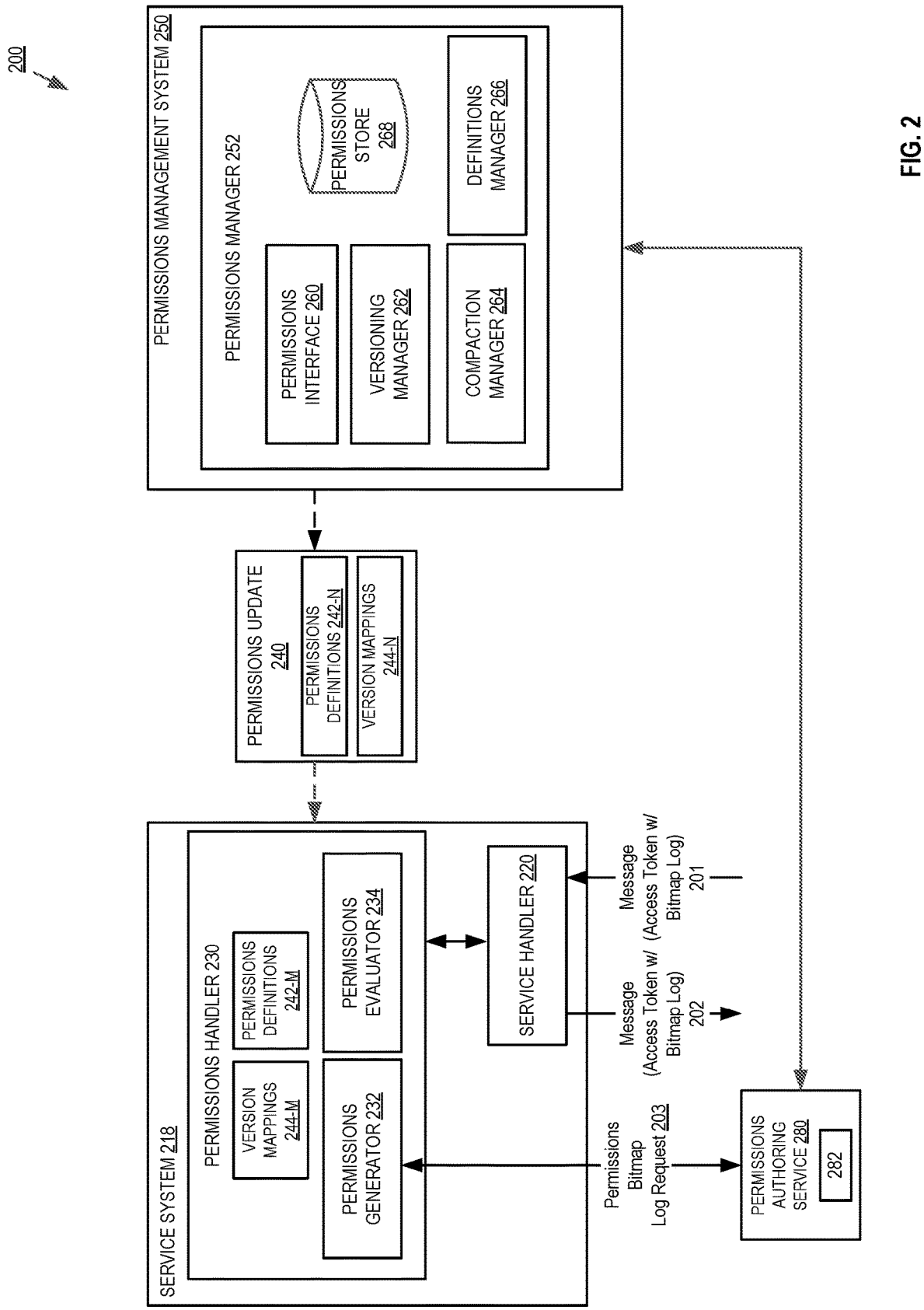
FIG. 2 is a block diagram of one embodiment of a distributed service provider system managing, encoding, and using permission bitmap logs.
Figure 6:
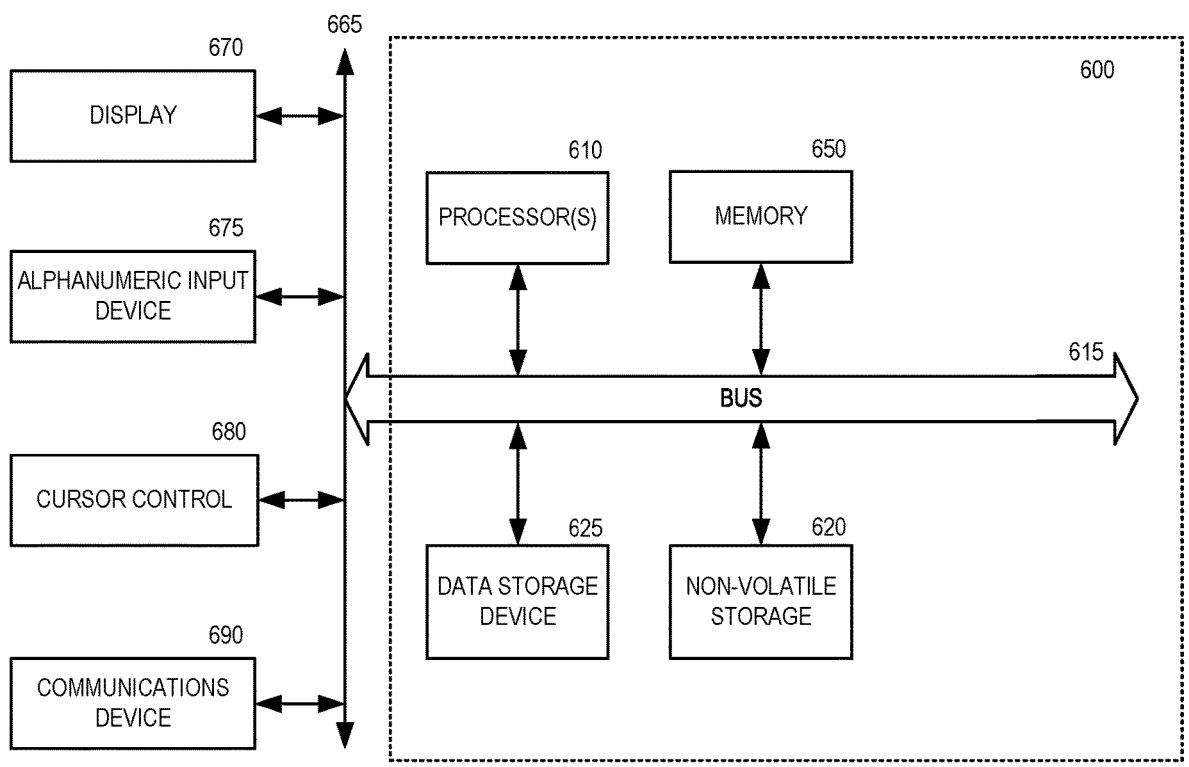
FIG. 6 is one embodiment of a computer system that may be used to support the systems and operations discussed herein.

FIG. 2 is a block diagram of one embodiment of a distributed service provider system 200 managing, encoding, and using permission bitmap logs. In the embodiment illustrated in FIG. 2, distributed service provider system 200 includes a permission management system 250, a service system 218, and a permission authoring service 280. Although only a single service system 218 is illustrated, the distributed service provider system may include any number of service systems (e.g., service system 118-1 through 118-N) implementing the techniques discussed herein. Furthermore, each of the systems illustrated in FIG. 2 may be distributed among different physical and/or logical computing device(s). One such computing device is illustrated in FIG. 6 and described below. Furthermore, each computing device may be executed on separate systems and communicate with one another over one or more communications network(s) (e.g., network 102).

Permission management system 250 is responsible for providing management functions for new and existing permissions. In an embodiment, permissions manager 252 receives new permission(s) at permissions interface 260 from one or more developer systems (not shown), where each new permission has defined attributes, such as the actions (e.g., read, write, delete, data access, etc.) that may be performed when the new permission is granted. These new permissions may be periodically received over time, and therefore grow the set of permissions used by the service of the distributed service system. The permissions interface may receive the permission via application programming interface (API), software development kit (SDK), standardized format (e.g., XML), or other form of messaging that communicates the permission and related information from the developer to the permissions interface 260.

Definitions manager 266 stores the new permission(s) in permissions store 268. Furthermore, for each new permission, definitions manager 266 updates a definitions data structure, which may be encoded in YAML, XML, or other method that encodes definitions (e.g., meanings, allowances, code, etc.) associated with each permission. The definitions data structure may be thought of as a dictionary that defines what each permission means. Furthermore, the encoding of the definitions data structure is such that each service system (e.g., service system 218) can translate the meaning of an individual permission using the definitions within the definitions data structure.

Furthermore, in response to receiving new permission(s), versioning manager 262 allocates a new permission in a mapping structure. The new permission to be added is added using an append only operation (e.g., no deletions or overwrites) to enforce an ordering of permissions and so that different permissions do not occupy the same position within the mapping structure or bitmap log (discussed below). The mapping structure maps individual permissions to positions within a permissions bitmap log, such as bitmap logs 302, 312, 322, and 332 illustrated and discussed in FIG. 3A. Thus, a permission within a bitmap log signifies that user/service has a permission associated with position [i] if and only if bitmap log contains a 1 (or other indicator) at position [i], and the mapping relates the definition within the definitions data structure to a specific position within the bitmap log.

Figures 3A, 3B:
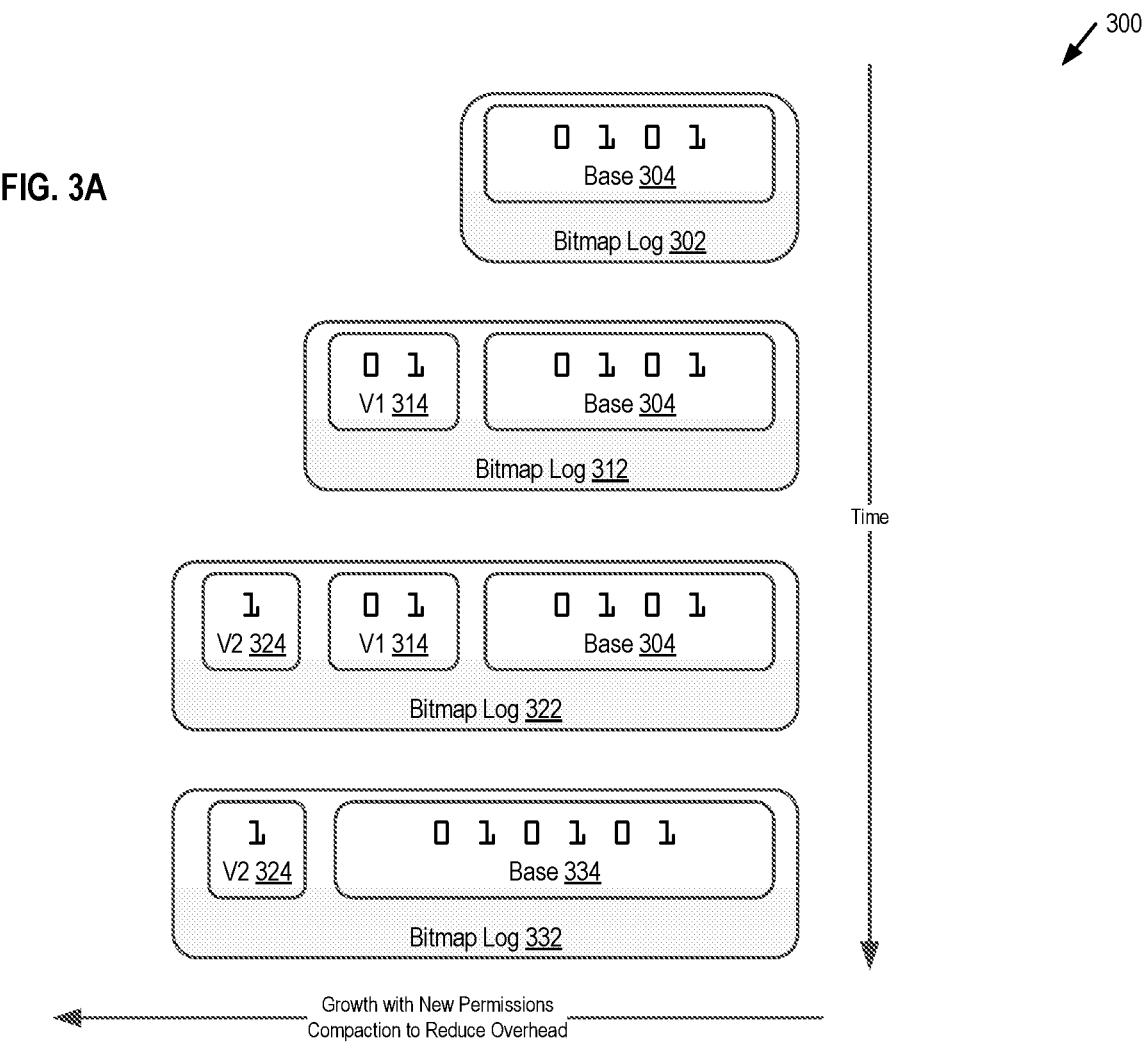
FIG. 3A is one embodiment of permission bitmap logs used by a distributed service provider system.
FIG. 3B is one embodiment of permission bitmap log truth table for use when enforcing permissions encoded in a permission bitmap log.

Each bitmap log is a collection of one or more bitmaps each being associated with incremented bitmap versions, and each version having a set of one or more associated permissions within the bitmap for the version. As illustrated in FIG. 3A, a base 304 represent a stable version of permissions within a bitmap log 302, and each version is added in response to versioning manager 262 receiving new permissions. That is, each new permission or set of permissions that is requested to be added by a developer system is added to the bitmap log 302 as a version, with new permissions added as incrementing versions. The version, may be associated with a timestamp for a time at which the new permission(s) were received by permissions interface 260. Thus, bitmap log 302 becomes bitmap log 312 including version 1 permissions 314 for two newly received permission, for which the definitions data structure and mapping are updated to reflect. Similarly, in response to receipt of another new permission at a different time, bitmap log 312 becomes bitmap log 322 including a version 2 permission 324 received after version 1 permissions 314, again for which the definitions data structure and mapping are updated to reflect. Furthermore, the append only nature and incrementing between versions enforces a global ordering of permissions. Thus, the definitions data structure generated by definitions manager 266 defines the permissions within the base and each new incremented version, and the mapping data structure maps each position within the base and each version to a specific permission defined within the definitions data structure.

In other words, a permission within an encoded bitmap log defines service capabilities, where $P_i=1$ if an only if a user/service has the permission associated with position i (e.g., a user/service may be granted a specific type of read access denoted by the permission at position [i] within a bitmap log). The mapping maps specific permissions (e.g., a granted admin read access permission) to a position within the log of bitmaps (e.g., position j, having a value of 1), and the definitions enable a service to determine whether the user associated with the permission bitmap log has the permission and translate that permission to the associated ability. Furthermore, the permissions bitmap log occupies a small amount of memory, on the order of bytes, ensuring that transmission of the bitmap log within access tokens is bandwidth and computationally efficient.

Returning to FIG. 2, permissions interface 260 periodically distributes permissions updates, such as permission update 240, to service systems including service system 218. The permissions update 240 carries a latest permission definitions data structure 242-N, and a latest version mapping data structure 244-N.

Furthermore, in embodiments, after a set period of time, the versioning manager 262 of permissions manager 252 performs bitmap log compaction. In an embodiment, after a set period of time, such as N days (e.g., 1 day, 7 days, 14 days, etc., as well as other time periods, such as 1 hour, 1 week, 2 months, etc.), permissions are considered to be stable and unlikely to change. Compaction manager 264 compacts the versions that are at least time N old into a base, and leaves the remaining versions that are not yet at least time N old. That is, the version(s) are concatenated with the base to extend the base to include the version into a single bitmap. For example, v1 permissions 314 may be concatenated with base 304 to form base 334 when v1 permissions are at least time N old. However, since v2 permission are not yet old enough, the v2 permission remain as a version bitmap and are not yet subject to compaction. This compaction enables reversions, in the event that they occur, to change within versions net yet committed or merged with the base, and accordingly do not change the stable base permissions. In embodiments, in addition to improving permissions stability, compaction reduces data storage by simplifying the bitmap log data structure that is to be encoded/transmitted in access tokens, and leaves open ability to revert/change permissions within fresher versions. Definitions manager 266 and versioning manager 262 then update the definitions and mapping data structures to reflect the compaction, as discussed above, and the new mappings/definitions are distributed as periodic permissions update messages.

In some embodiments, permission reverts may occur (e.g., a permission rollback and/or change) is received from a developer. That is, a developer may change a permission definition or remove a permission entirely. Furthermore, a permission may be later added after a revert that removed a position (e.g., causing an original permission at position x of bitmap y, and later a different permission at position x of bitmap y, e.g., escalation). Evaluating an intersection of a bitmap from token's embedded bitmap and the definitions/mappings (e.g., local definition data structure maintained at a service system) results in non-agreement between a bitmap log of an access token and a definition of permissions (e.g., the permissions embedded within a token do not match a permission definition/mapping, the permission and associated function can be dropped (as discussed below)). Then, upon compaction to a base, such reversions and mappings will correct the reversion by including the stable definition and mapping, which prevents privilege escalation.

In embodiments, service 218 periodically receives the permission update messages, such as update message 240 with definitions 242-N and version mappings 244-N. The permissions handler 240 stores the definitions 242-N and version mappings 244-N to replace older definitions and mappings 244-M and 242-N. These form a local copy of definitions and mappings for use when receiving service-to-service messages and sending service-to-service messages, as discussed below.

When the service system 218 seeks to generate a new service-to-service message associated with a user, account, service, etc., such as to provide an associated service to the user, account, service, etc., permissions generator 232 of service system 218 requests privileges from permission authoring service 280. Note that permission authoring service 280 may also exchange permission update messages (e.g. message 240) with permission management system 250 to get latest permissions. Permission authoring service 280 looks up permissions in a permissions data store 282, for example based on an identifier of a user, service, account, etc. for which a message is to be generated, and uses located permissions to encode a log of bitmaps (e.g., one of 302, 312, 322, or 332 depending on a time in which the bitmap log is generated), having the structure defined by the permissions definitions and version mappings. In some embodiments, a request, user, account, etc. may be associate with more than one identifier, and thus permission authoring service 280 returns a set of bitmap logs. The one or more bitmap logs are then communicated to permissions handler 230.

Service handler 220 uses the received bitmap log(s) and encodes the bitmap log(s) on an access token for a service-to service message 202. The message 202 with the access token may then be transmitted to another service within the distributed service processing system.

Service system 218 may also periodically receive service-to-service messages, such as service-to-service message 201. The message 201 may include an access token with a bitmap log. When receiving and processing a new message (e.g., message 201), the access token is accessed by the permission evaluator 234. As discussed herein, the actual permissions encoded within the bitmap log impact what actions the service system 218 may perform in response to the message 201.

In an embodiment, permission evaluator 232 first performs a bitwise intersection on bitmap logs when two or more are included in message 201 (e.g., due to the message having multiple sets of permissions). The bitwise intersection forms a single logical bitmap log that reflects the union of each of the bitmap logs. This operation can be skipped when an incoming message has only a single bitmap log. By forming a single logical bitmap log, the later operations for evaluating permissions are simplified (e.g., preserve service processing resources) by avoiding multiple log permission evaluations. Furthermore, the bitwise union is a computationally efficient operation for forming the single logical bitmap. Permissions evaluator 234 then takes an intersection between the dictionary bitmap log structure (formed using the stored permissions definitions) and the formed logical bitmap to determine what the received bitmap log and the defined bitmap log have in common. Lack of commonality may indicate a reversion (e.g., when a permission is missing or different), and appropriate permissions can be selected for use in processing a service requested by message 201, as discussed below.

In an embodiment, a truth table 350, such as that illustrated in FIG. 3B is used by permissions evaluator 234 to determine what permissions are to be used in evaluating a service request. When versions of permission within an access token ($V_t$) correspond with the permissions expected from the definitions and mappings (Vt), such that the intersection does not show differences, then the permissions evaluator 234 enables the service to process any permission on the access token within the message 201. However, when the access token permission includes one or more versions (e.g., $V_{t+1}$) not within the permissions expected from the definitions and mappings ($V_t$), such that the intersection does show differences, permissions evaluator 232 ignores the grants in any version past $V_t$. That is, any permission not yet defined in the stored definitions/mappings is ignored by permission evaluator 234. Furthermore, when the access token permission includes versions (e.g., $V_t$) and the permissions expected from the definitions mappings ($V_{t+1}$) include additional permissions bitmap versions not within the access token, such that the intersection does show differences, permissions evaluator 234 enforces the additional defined grants in versions past $V_t$, but at the same time denies the permissions by default. Therefore, for grants/permissions not within intersection of bitmap log structure and logical bitmap structure, the permissions are not allowed to result in a service action and avoid permission escalation.

Figure 4:
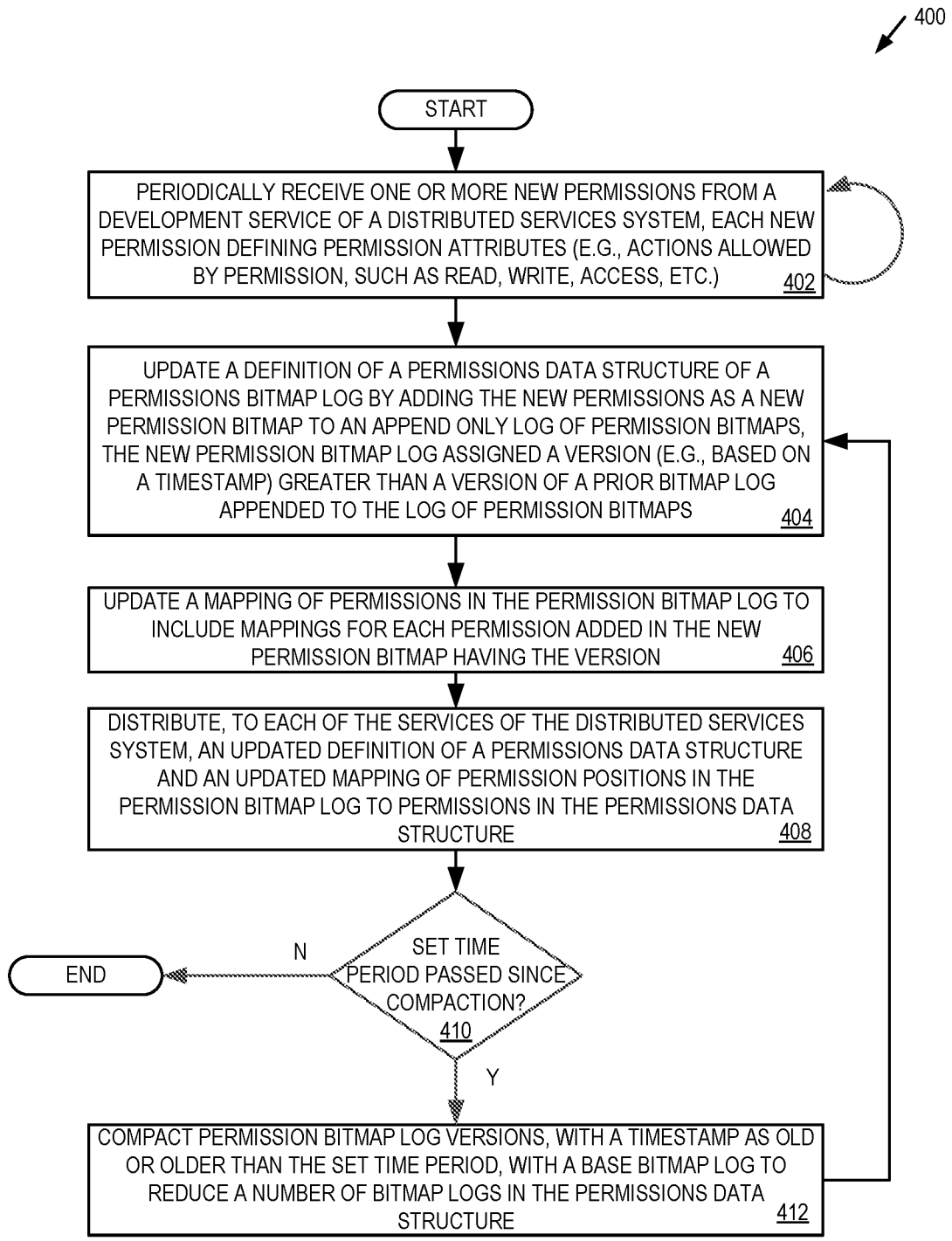
FIG. 4 is one embodiment of a process for permission management system of a distributed service provider system generating and distributing permissions definitions and version mappings for permissions bitmap logs.

FIG. 4 is one embodiment of a process 400 for permission management system of a distributed service provider system generating and distributing permissions definitions and version mappings for permissions bitmap logs. The process 400 is performed by processing logic that may comprise hardware (circuitry, dedicated logic, etc.), software (such as is run on a general purpose computer system or a dedicated machine), firmware, or a combination. In one embodiment, the process 400 is performed a permission management system 250, as discussed in FIG. 2.

Referring to FIG. 4, processing logic begins by periodically receiving one or more new permissions from a development service of a distributed services system, each new permission defining permission attributes (e.g., actions allowed by permission, such as read, write, access, etc.) (processing block 402). These new permission(s) are received in groups of one or more, for example, in response to development of services within the distribute service system. For example, as existing services are improved and/or new services added to a distributed services system, the services add permissions regarding what actions are allowable with respect to those services.

Processing logic updates a definition of a permissions data structure of a permissions bitmap log by adding the new permissions as a new permission bitmap to an append only log of permission bitmaps, the new permission bitmap assigned a version (e.g., based on a timestamp) greater than a version of a prior bitmap log appended to the log of permission bitmaps (processing block 404). As discussed herein, a permission bitmap log includes a set of one or more bitmaps, including a base bitmap and zero or more version bitmaps. The versions are incrementing and correspond with the timestamps at which the new permission(s) are added. Furthermore, the bitmap log including versions is an append-only log to avoid overwriting and causing privilege escalation. The data structure reflects the added permissions and the meaning (e.g., code, value, etc.) of the new permission(s). Processing logic further updates a mapping of permissions in the permission bitmap log to include mappings for each permission added in the new permission bitmap having the version (processing block 406). That is, the mapping reflects the added version bitmap and permissions within that are appended to the existing permissions bitmap log.

Processing logic distributes, to each of the services of the distributed services system, an updated definition of a permissions data structure and an updated mapping of permission positions in the permission bitmap log to permissions in the permissions data structure (processing block 408). As discussed herein, permissions update messages may be distributed to services periodically to reflect new permissions added to a permissions bitmap log, current versioning information, and how specific permissions are mapped to base and version bitmaps.

Processing logic determines whether a set time period has passed since a last compaction operation (processing block 410). The time period is a number of minutes, hours, days, etc., and is selected to ensure stability in permissions (e.g., minimize the likelihood of a permission reversion or rollback). When the time period is determined not to have passed, the process ends. However, when the time period has passed, the process proceeds to processing block 412.

Processing logic compacts the permission bitmap log versions, with a timestamp as old or older than the set time period, with a base bitmap log to reduce a number of bitmap logs in the permissions data structure (processing block 412). In an embodiment, processing logic concatenates the bitmap log versions as old or older than the set time period in the associated version ordering to with the base bitmap log. This forms a larger base bitmap, but reduces the number of different bitmaps within the bitmap log structure, thereby reducing the memory footprint of the bitmap log. After compaction, the process returns to processing block 404 so that the definitions and mappings can be updated, and the updates distributed to services of the distributed service system.

Figure 5A:
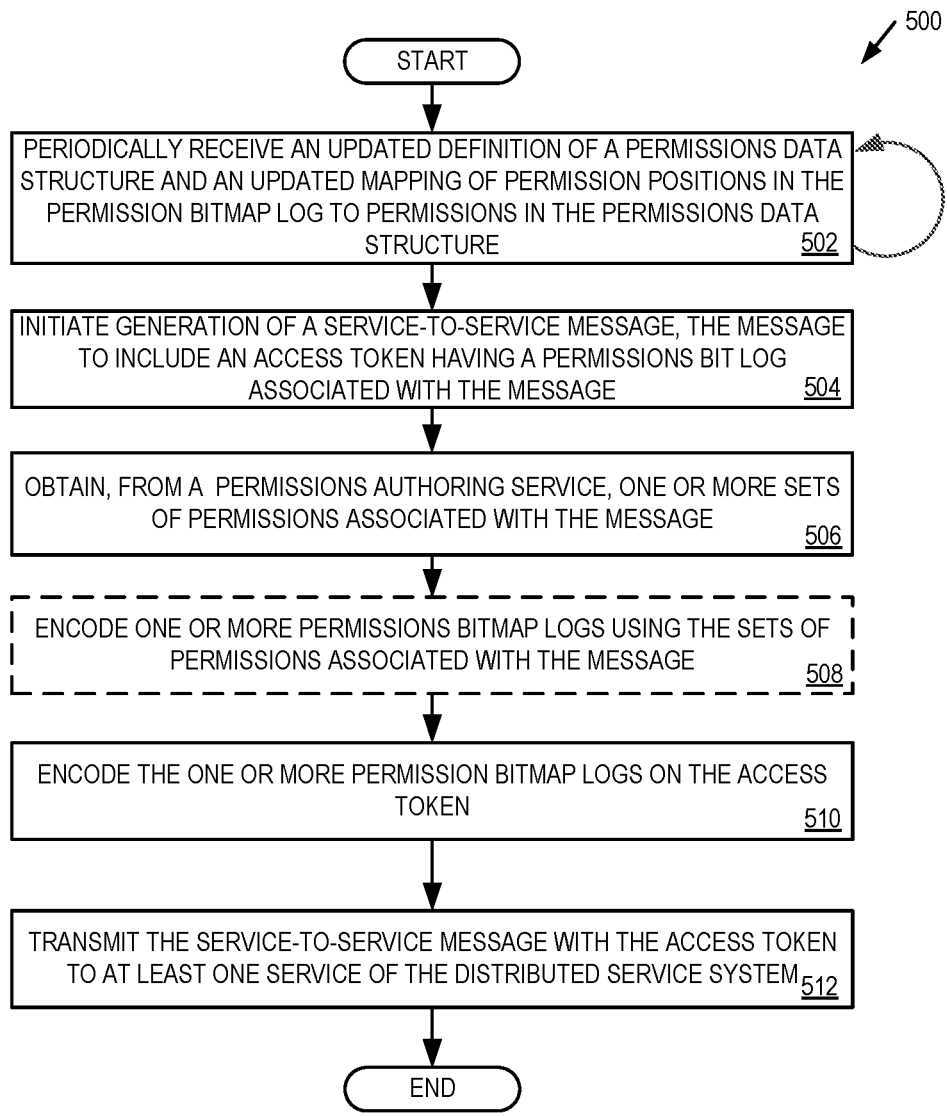
FIG. 5A is one embodiment of a process for a service of a distributed service system using a permission bitmap log when transmitting a service-to-service message.

FIG. 5A is one embodiment of a process for a service of a distributed service system using a permission bitmap log when transmitting a service-to-service message. The process 500 is performed by processing logic that may comprise hardware (circuitry, dedicated logic, etc.), software (such as is run on a general purpose computer system or a dedicated machine), firmware, or a combination. In one embodiment, the process 500 is performed a permission handler 230 of a service system, as discussed in FIG. 2.

Referring to FIG. 5A processing logic begins by periodically receiving an updated definition of a permissions data structure and an updated mapping of permission positions in the permission bitmap log to permissions in the permissions data structure (processing block 502). The updated definitions and mappings are those generated by the process of FIG. 4 discussed above. Furthermore, a local version of the definitions and version mappings are stored in a memory associated with the service for later usage when processing service-to-service messages.

Processing logic initiates generation of a service-to-service message, the message to include an access token having a permissions bit log associated with the message (processing block 504). The message may be initiated at the direction of the service, in response to another service message, etc. The message, in embodiments, will request an action, function, etc. from another service on behalf of a user, service, system, etc., and therefore is to include the access token with permissions indicating what the user, service, system, etc. is allowed to do within the distributed service processing system.

Processing logic obtains, from a permissions authoring service, one or more sets of permissions associated with the message (processing block 506). That is, an identifier of a distributed service system user, service identifier, etc., is used to obtain/look up the permissions associated with that use, their account, etc. Furthermore, the permissions may include a set of one or more groups of permissions, for example when an identifier is associated with more than one use, account, service, etc.

Processing logic encodes one or more permission bitmap logs using the sets of permissions associated with the message (processing block 508). In some embodiments, the permissions are encoded by processing logic into a set of bitmap logs for each permission set obtained (e.g., for each user, account, service, etc.). In some embodiments, the bitmap logs may be obtained directly in a bitmap log encoding from a permissions authoring service, as discussed herein.

The one or more permission bitmap logs are encoded on the access token (processing block 510), and transmitted in a service-to-service message with the access token to at least one service of the distributed service system (processing block 512).

Figure 5B:
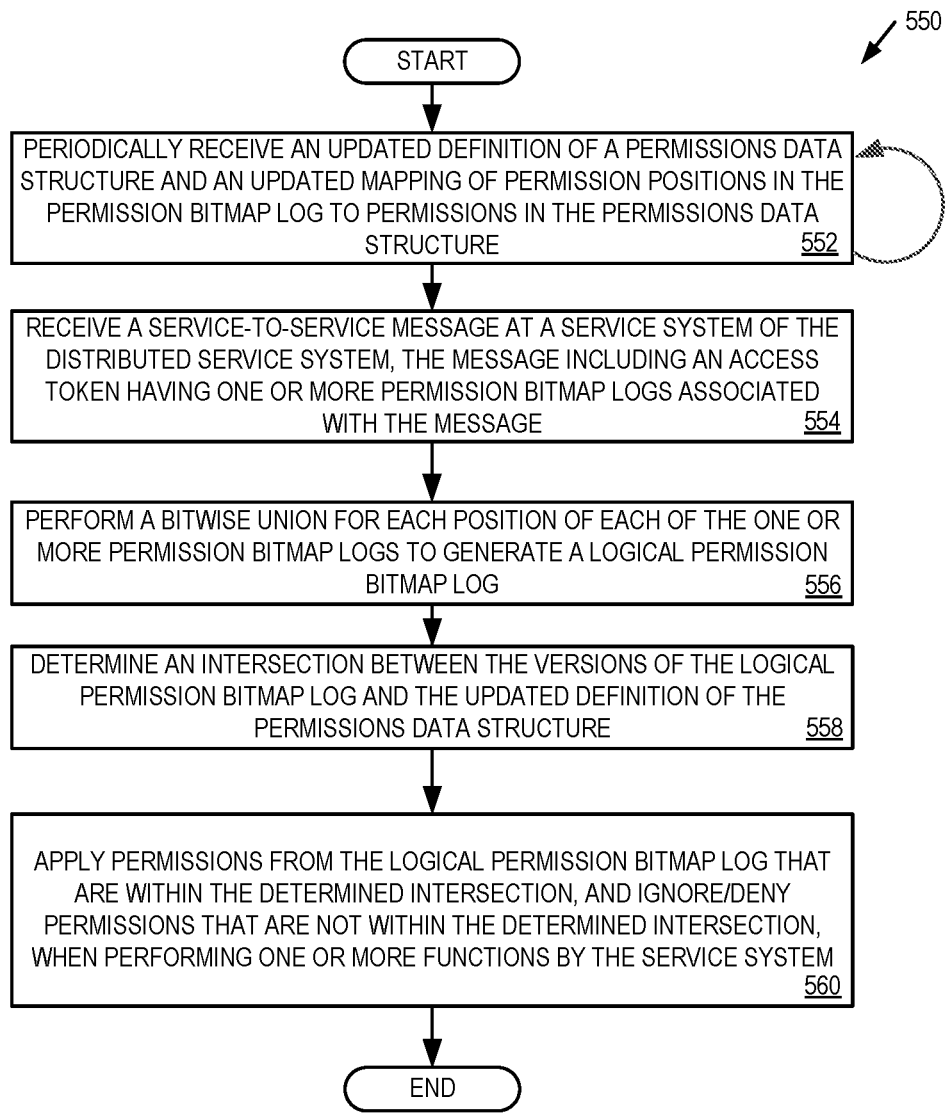
FIG. 5B is one embodiment of a process for a service of a distributed service system using a permission bitmap log when receiving a service-to-service message.

FIG. 5B is one embodiment of a process 550 for a service of a distributed service system using a permission bitmap log when receiving a service-to-service message. The process 550 is performed by processing logic that may comprise hardware (circuitry, dedicated logic, etc.), software (such as is run on a general purpose computer system or a dedicated machine), firmware, or a combination. In one embodiment, the process 550 is performed a permission handler 230 of a service system, as discussed in FIG. 2.

Referring to FIG. 5B, processing logic begins by periodically receiving an updated definition of a permissions data structure and an updated mapping of permission positions in the permission bitmap log to permissions in the permissions data structure (processing block 552). As discussed above, the updated definitions and mappings are those generated by the process of FIG. 4 discussed above, and are used to store a current local version of the definitions and version mappings in a memory associated with the service.

Processing logic then receives a service-to-service message at a service system of the distributed service system, the message including an access token having one or more permission bitmap logs associated with the message (processing block 554). In embodiments, the access token may include a number of permission bitmap logs each associated with permissions to be applied to the service/operation being requested by the received service-to-service message.

Rather than processing each bitmap log separately until an appropriate permission is found, or no permissions are found in any bitmap log, processing logic perform a bitwise union for each position of each of the one or more permission bitmap logs to generate a logical permissions log of bitmaps (processing block 556). That is, bitwise operations, such as a union operation across bitmap logs at each position is a computationally efficient operation, more so than processing separate bitmap logs against a permission mapping and definition data structure. Thus, the combination of the one or more bitmap logs into a single logical bitmap log ensures increased computational efficiency in permissions application.

Processing logic then determines an intersection between the versions of the logical permission bitmap log and the updated definition of the permissions data structure (processing block 558). The intersection reveals whether there are any differences in the logs, such as reverts, changed positions, etc. in versions not yet committed to a base bitmap. Processing logic then applies permissions from the logical permissions log of bitmaps that are within the determined intersection (e.g., permissions applied in 360 of FIG. 3B), and ignores/denies permissions that are not within the determined intersection of versions (e.g., permissions from version not within the intersection are ignored when the access token has additional versions as shown in 362 of FIG. 3B, and permissions from version not within the intersection are applied by denied when the definitions/mappings have additional versions as shown in 364 of FIG. 3B), when performing one or more functions by the service system.

FIG. 6 is one embodiment of a computer system that may be used to support the systems and operations discussed herein. For example, the computer system illustrated in FIG. 6 may be used by a service system, a permission authoring service system, a permission management system, or any other distributed system. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A computer implemented method for managing and using permissions in a distributed services system, comprising:

receiving, by a service system of the distributed services system, a definition of a permissions data structure and a mapping of permission positions from a permissions bitmap log to permissions in the permissions data structure, wherein the permission bitmap log is a binary encoded log;

receiving, by the service system, a service-to-service message that comprises a request of the service system and an access token having two or more permissions bitmap logs associated with the message, each of the two or more permissions bitmap logs being binary encoded logs;

generating, by the service system, a single logical binary encoded bitmap log that comprises a set of permissions that are determined to be within an intersection of permissions between the two or more permissions bitmap logs associated with the message and the definition of the permissions data structure; and processing, by the service system, the request based on a binary value at a position of the single logical binary encoded bitmap log, and wherein a permission at the position is a required permission for processing the request.

2. The method of claim 1, wherein each of the two or more permissions bitmap logs comprises a base bitmap and a version bitmap, wherein the base bitmap comprises the set of permissions and the version bitmap comprises a second set of permissions.

3. The method of claim 2, wherein the method further comprises:

performing a bitwise union for each position of each of the two or more permissions bitmap logs to generate the single logical permissions bitmap log;

determining, by the service system, the intersection of the logical permission bitmap log and the definition of the permissions data structure; and processing, by the service system, the request based on the permissions within the logical permission bitmap log that are determined to be within the intersection.

4. The method of claim 3, wherein the definition of the permissions data structure comprises a definition of a base bitmap and one or more version bitmaps, the method further comprising:

when an additional version bitmap associated with the message is determined not to be within the intersection and is determined to be after each of the one or more version bitmaps from the definition of the base bitmap and one or more version bitmaps, ignoring, by the service system, permissions from the additional version bitmap when processing the request; and when at least one of the one or more version bitmaps from the definition of the base bitmap and one or more version bitmaps are determined to be after the version bitmap associated with the message, denying, by the service system, permissions from the at least one of the one or more version bitmaps from the definition of the base bitmap and one or more version bitmaps.

5. The method of claim 1, further comprising:
initiating, by the service system, generation of a second service-to-service message, the second message to include a second access token having one or more permissions bitmap logs associated with the second message;
obtaining, by the service system, the one or more permissions bitmap logs including the set of permissions associated with the second message;
encoding the second access token to comprise the one or more permissions bitmap logs associated with the second message and a service request of a second service system; and
transmitting the second service-to-service message to the second service system, the second service-to-service message comprising the encoded second access token.

6. The method of claim 1, further comprising:
receiving, by a third service system of the distributed service system, a new permission, the new permission defining one or more permission attributes of the new permission;
updating, by the third service system, the definition of the permissions data structure of the permissions bitmap log by adding the new permission as a new permission bitmap appended to the permissions bitmap log, the new permission bitmap assigned a version greater than any version of a prior bitmap appended to the permissions bitmap log and added after a base bitmap; and
updating the mapping of permission positions to include a mapping of a position of the new permission in the appended new permission bitmap to the permissions data structure; and
distributing, by the third service system, the updated mapping of permission positions and the updated definition of the permissions data structure to each service system of the distributed service system.

7. The method of claim 6, wherein the version corresponds with a time when the new permission is received by the third service system.

8. The method of claim 6, further comprising:
determining, by the third service system, that at least a predefined period of time has passed since the new permission was received;
compacting the permissions bitmap log by concatenating the new permission bitmap with the base bitmap;
performing a second updating of the definition of the permissions data structure and the mapping of permission positions to reflect the compacting of the permission bitmap log; and
distributing, by the third service system, the second updating of the mapping of permission positions and the definition of the permissions data structure to each service system of the distributed service system.

9. A non-transitory computer readable storage medium including instructions that, when executed by a processor, cause the processor to perform operations for managing and using permissions in a distributed services system, the operations comprising:
receiving, by a service system of the distributed services system, a definition of a permissions data structure and a mapping of permission positions from a permissions bitmap log to permissions in the permissions data structure, wherein the permission bitmap log is a binary encoded log;
receiving, by the service system, a service-to-service message that comprises a request of the service system and an access token having two or more permissions bitmap logs associated with the message, each of the two or more permissions bitmap logs being a binary encoded log;
generating, by the service system, a single logical binary encoded bitmap log that comprises a set of permissions that are determined to be within an intersection of permissions between the two or more permissions bitmap logs associated with the message and the definition of the permissions data structure; and
processing, by the service system, the request based on a binary value at a position of the single logical binary encoded bitmap log, and wherein a permission at the position is a required permission for processing the request.

10. The non-transitory computer readable storage medium of claim 9, wherein each of the two or more permissions bitmap logs comprises a base bitmap and a version bitmap, wherein the base bitmap comprises the set of permissions and the version bitmap comprises a second set of permissions.

11. The non-transitory computer readable storage medium of claim 10, wherein the operations further comprising:
performing a bitwise union for each position of each of the two or more permissions bitmap logs to generate the single logical permissions bitmap log;
determining, by the service system, the intersection of the logical permission bitmap log and the definition of the permissions data structure; and
processing, by the service system, the request based on the permissions within the logical permission bitmap log that are determined to be within the intersection.

12. The non-transitory computer readable storage medium of claim 11, wherein the definition of the permissions data structure comprises a definition of a base bitmap and one or more version bitmaps, the operations further comprising:
when an additional version bitmap associated with the message is determined not to be within the intersection and is determined to be after each of the one or more version bitmaps from the definition of the base bitmap and one or more version bitmaps, ignoring, by the service system, permissions from the additional version bitmap when processing the request; and
when at least one of the one or more version bitmaps from the definition of the base bitmap and one or more version bitmaps are determined to be after the version bitmap associated with the message, denying, by the service system, permissions from the at least one of the one or more version bitmaps from the definition of the base bitmap and one or more version bitmaps.

13. The non-transitory computer readable storage medium of claim 9, the operations further comprising:
receiving, by a third service system of the distributed service system, a new permission, the new permission defining one or more permission attributes of the new permission;
updating, by the third service system, the definition of the permissions data structure of the permissions bitmap log by adding the new permission as a new permission bitmap appended to the permissions bitmap log, the new permission bitmap assigned a version greater than any version of a prior bitmap appended to the permissions bitmap log and added after a base bitmap; and updating the mapping of permission positions to include a mapping of a position of the new permission in the appended new permission bitmap to the permissions data structure; and distributing, by the third service system, the updated mapping of permission positions and the updated definition of the permissions data structure to each service system of the distributed service system.

14. The non-transitory computer readable storage medium of claim 13, further comprising:

determining, by the third service system, that at least a predefined period of time has passed since the new permission was received;

compacting the permissions bitmap log by concatenating the new permission bitmap with the base bitmap;

performing a second updating of the definition of the permissions data structure and the mapping of permission positions to reflect the compacting of the permission bitmap log; and distributing, by the third service system, the second updating of the mapping of permission positions and the definition of the permissions data structure to each service system of the distributed service system.

15. A distributed services system, comprising:

a permissions management service system; and a service system, communicatively coupled with the permissions management system, comprising a non-transitory memory storing instructions and a processor that executes the instructions causing the processor perform operations, comprising:

receiving, from the permissions management service system, a definition of a permissions data structure and a mapping of permission positions from a permissions bitmap log to permissions in the permissions data structure, receiving, from a second service system of the distributed services system, a service-to-service message that comprises a request of the service system and an access token having two or more permissions bitmap logs associated with the message, wherein each of the one or more permission bitmap logs is a binary encoded log, generating a single logical binary encoded bitmap log that comprises a set of permissions that are determined to be within an intersection of permissions between the two or more permissions bitmap logs associated with the message and the definition of the permissions data structure, and processing the request based on a binary value at a position of the single logical binary encoded bitmap log, and wherein a permission at the position is a required permission for processing the request.

16. The distributed system of claim 15, wherein each of the two or more permissions bitmap logs comprises a base bitmap and a version bitmap, wherein the base bitmap comprises the set of permissions and the version bitmap comprises a second set of permissions.

17. The distributed system of claim 16, wherein the processor executes the instructions to further perform operations comprising:

performing a bitwise union for each position of each of the two or more permissions bitmap logs to generate the single logical permissions bitmap log;

determining the intersection of the logical permission bitmap log and the definition of the permissions data structure; and processing the request based on the permissions within the logical permission bitmap log that are determined to be within the intersection.

18. The distributed system of claim 15, wherein the processor executes the instructions to further perform operations comprising:

initiating generation of a second service-to-service message, the second message to include a second access token having one or more permissions bitmap logs associated with the second message;

obtaining the one or more permissions bitmap logs including the set of permissions associated with the second message;

encoding the second access token to comprise the one or more permissions bitmap logs associated with the second message and a service request of a third service system; and transmitting the second service-to-service message to the third service system, the second service-to-service message comprising the encoded second access token.

19. The distributed system of claim 15, wherein the permissions management service system comprises a second memory storing second instructions and a second processor that executes the second instructions causing the second processor to perform operations comprising:

receiving a new permission, the new permission defining one or more permission attributes of the new permission;

updating the definition of the permissions data structure of the permissions bitmap log by adding the new permission as a new permission bitmap appended to the permissions bitmap log, the new permission bitmap assigned a version greater than any version of a prior bitmap appended to the permissions bitmap log and added after a base bitmap;

updating the mapping of permission positions to include a mapping of a position of the new permission in the appended new permission bitmap to the permissions data structure; and distributing the updated mapping of permission positions and the updated definition of the permissions data structure to each service system of the distributed service system.

20. The distributed system of claim 19, wherein the second processor executes the second instructions to further perform operations comprising:

determining that at least a predefined period of time has passed since the new permission was received;

compacting the permissions bitmap log by concatenating the new permission bitmap with the base bitmap;

performing a second updating of the definition of the permissions data structure and the mapping of permission positions to reflect the compacting of the permission bitmap log; and distributing the second updating of the mapping of permission positions and the definition of the permissions data structure to each service system of the distributed service system.

* * * * *